United States Patent [19]

Duello

[11] Patent Number: 4,646,851

[45] Date of Patent: Mar. 3, 1987

[54] BI-FOLD TOOLBAR

[76] Inventor: Dennis E. Duello, R.R. #2, Box 138, Vinton, Iowa 52349

[21] Appl. No.: 588,347

[22] Filed: Mar. 12, 1984

[51] Int. Cl.[4] ............................................. A01B 63/24
[52] U.S. Cl. .................................. 172/776; 172/689; 172/311
[58] Field of Search ............... 172/311, 456, 776, 314, 172/688, 689; 171/143

[56] References Cited

U.S. PATENT DOCUMENTS

| | | | |
|---|---|---|---|
| 1,299,044 | 4/1919 | Sklovsky | 172/314 |
| 3,542,138 | 4/1968 | Fackler | 172/311 |
| 4,127,283 | 11/1978 | Baden | 172/689 X |
| 4,137,852 | 9/1976 | Pratt | 172/311 |
| 4,318,444 | 5/1980 | Hake | 172/311 |
| 4,319,643 | 3/1980 | Carter | 172/311 |
| 4,341,269 | 3/1980 | Hann | 172/311 |
| 4,366,867 | 3/1980 | Filbrun | 172/311 |
| 4,402,367 | 6/1981 | Couser | 172/311 |
| 4,461,356 | 7/1984 | Larson | 172/311 |

FOREIGN PATENT DOCUMENTS 230279 9/1959 Australia ............................. 172/311

Primary Examiner—Richard J. Johnson
Assistant Examiner—Terrence L. B. Brown
Attorney, Agent, or Firm—James C. Nemmers

[57] ABSTRACT

A horizontal bi-fold toolbar which has two outer sections pivotally mounted at each end of a central main section so that the two outer sections can be folded in a horizontal plane to reduce the width to approximately one-half that of the fully extended toolbar. When folded, the toolbar can be easily transported on roads and highways, but more importantly, when folded the toolbar provides a tandem arrangement which can be used for narrow row planting and other agricultural functions.

6 Claims, 4 Drawing Figures

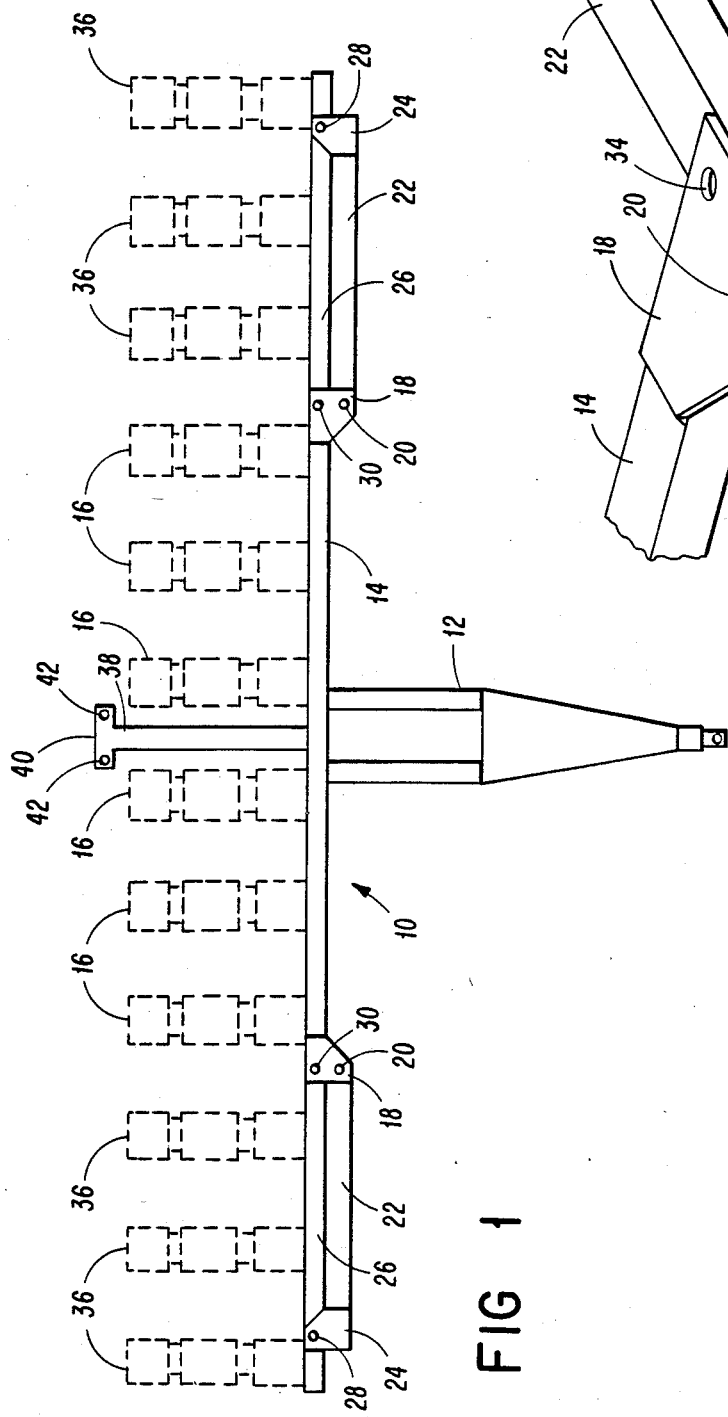
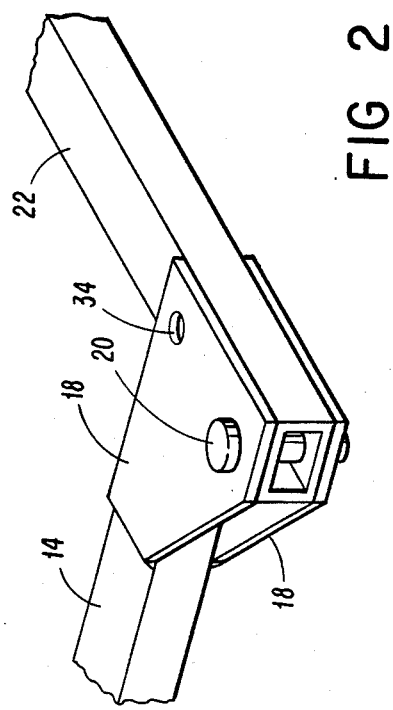

BI-FOLD TOOLBAR

BACKGROUND OF THE INVENTION

As the size of farms has grown and improvements have been made in agricultural methods permitting the farmer to perform farming functions more efficiently, equipment has been developed and is used for performing most agricultural functions on a multiple row basis. As larger and larger equipment became available enabling the farmer to perform a particular function on many rows in a single pass, it became increasingly difficult for the farmer to transport this wide equipment over the road to his fields. Thus, folding toolbars have been developed which serve the purpose of reducing the overall width of the multiple row equipment. Typically, the outer ends or wings of the toolbar are constructed so as to permit them to be folded approximately 90° upward, forward or rearward from their extended position In many instances, these folded toolbars provide a configuration that is relatively unstable rendering them somewhat unsafe when transported over the road.

More importantly, when the toolbar is folded, the orientation of the tools or other components attached to the toolbar is completely altered rendering them useless in the folded position.

In the cornbelt the most popular corn row width is 30", but for soybeans the trend is toward a row width of 15". Frequently, both crops are grown by the same farmers. Thus, planting crops in two different row widths requires that the farmer purchase and maintain two specialized planters or that substantial mechanical modifications be performed on a single planter to prepare it for the different row widths. While some manufacturers offer removable attachments or a removable tandem unit with planters attached, the tandem units (which serve to divide the frontrow width) are of no use during the planting of the wider row crop.

There is therefore a need for an improved toolbar which will provide a stable unit during transportation in a folded position. There is further need for a toolbar which easily, efficiently and completely converts to use in either row width. It is highly desirable then, that when in the folded position, the toolbar can perform a useful function such as narrow row (or inter-row) planting.

SUMMARY OF THE INVENTION

The folding toolbar of the invention consists of a fixed main or central section at the outer ends of which are sections that are pivotally mounted for movement in a horizontal plane. An intermediate section at each end of the center section is pivoted at each end in a precise manner so that the outer section, which is pivotally secured to the intermediate section, will fold inwardly to lie along the intermediate section and join with the main center section when the toolbar is in its most fully extended position. However, when the toolbar is folded for either transportation or the formation of a tandem unit, the intermediate section extends rearwardly while the outer section at each end will be positioned parallel to and to the rear of the central main section with the free ends of the outer sections joined together. This thus forms a unit that is approximately one-half the width of the unit when the toolbar is in the most fully extended position, and also properly positions the tools or other components, such as planting units, in a tandem position for row widths one-half those of the row widths when the unit is in its most fully extended position.

BRIEF DESCRIPTION OF THE DRAWINGS

FIG. 1 is a top or plan view of a toolbar in its most fully extended position and showing in dotted lines representations of the position of planters or other attachments to the toolbar;

FIG. 2 is a perspective view showing the hinge connection between the main section and intermediate sections of the toolbar;

DESCRIPTION OF THE PREFERRED EMBODIMENT OF THE INVENTION

Figure 4:
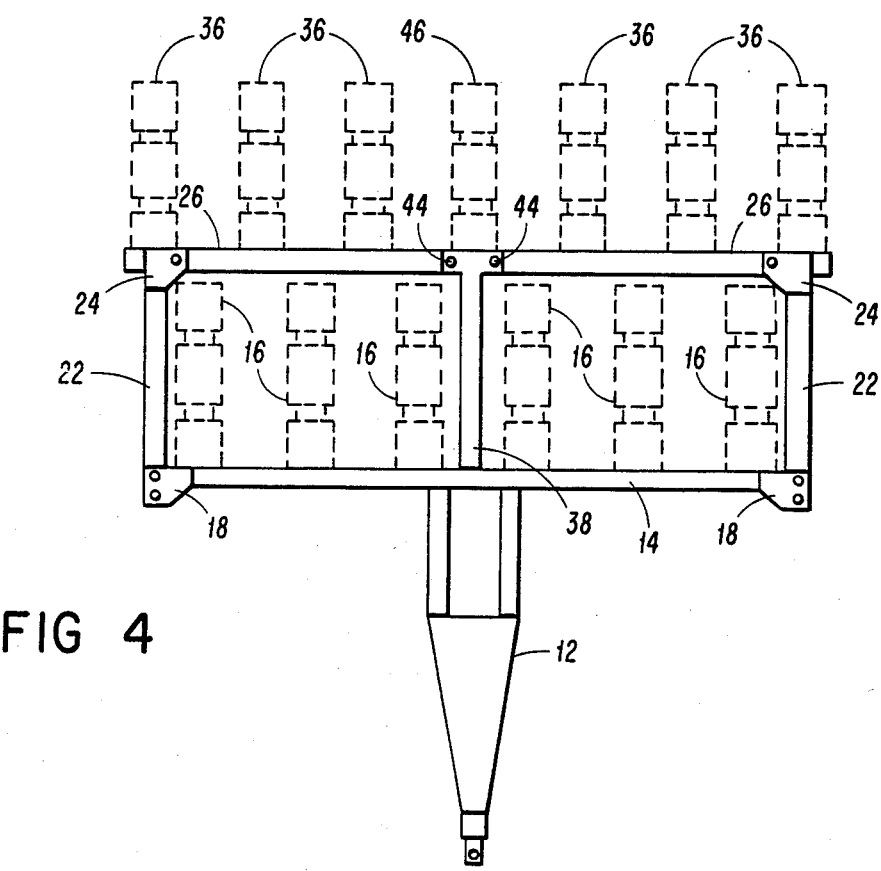
FIG. 4 is a top or plan view showing the toolbar in the folded position to form a tandem toolbar unit.

Referring first to FIG. 1, there is shown a plan view of a toolbar indicated generally by the reference numeral 10 to which there is attached a drawbar 12 for attachment to the hitch of a tractor (not shown) or other prime mover. The toolbar 10 is supported on ground engaging wheels (not shown) so that the unit can be towed over agriculture fields and also towed over the road.

The toolbar 10 has a main center section 14 which is adapted to receive six attachments 16 (shown in dotted lines) three on each side of the center of the main section 14. These attachments 16 of course depend upon the particular farm operation to be performed, and can be a variety of different tools, planters, fertilizer attachments, etc. As shown in FIG. 1, the attachments 16 are spaced evenly for typical row spacing which in the case of corn is commonly 30".

Rigidly affixed to the main section 14 at each of its outer ends is a pair of vertically spaced apart plates 18 which extend forwardly of the main section 14 to provide a pivot point offset forwardly of the main section 14. Pivotally connected to the plates 18 at the offset pivot by pivot pin 20 is an intermediate section 22. When the toolbar 10 is in its most fully extended position as shown in FIG. 1, each of the intermediate sections 22 lies parallel to the main section 14 and just forwardly of the main section 14.

At the outer end of each intermediate section 22 is a pair of vertically spaced apart plates 24 which provide a pivot offset rearwardly so that the outer section 26 can be pivotally connected by pivot pin 28 to the intermediate section. By reason of the offset pivot provided by pivot pin 28, the outer section can be folded inwardly against the intermediate section 22 so that the outer section 26 lies in alignment with the main section 14 as best seen in FIG. 1. When in this position, a pivot pin 30 can be placed through the opening 32 in the outer end of outer section 26 and through the opening 34 extending through each of the plates 18 so as to lock the outer section 26 in place in alignment with the main section 14. This thus provides a rigid toolbar.

As best seen in FIG. 1, the inner end of outer section 26 extends beyond the pivot pin 28 so as to provide sufficient length for the attachment of three more attachments 36 which are equally spaced from the attachments 16 to maintain the 30" or other selected interval. Thus, in the fully extended position of FIG. 1, and with the outer section 26 locked in place at each end of the main section 14, the unit of the invention is capable of serving as a 12 row unit.

Figure 3:
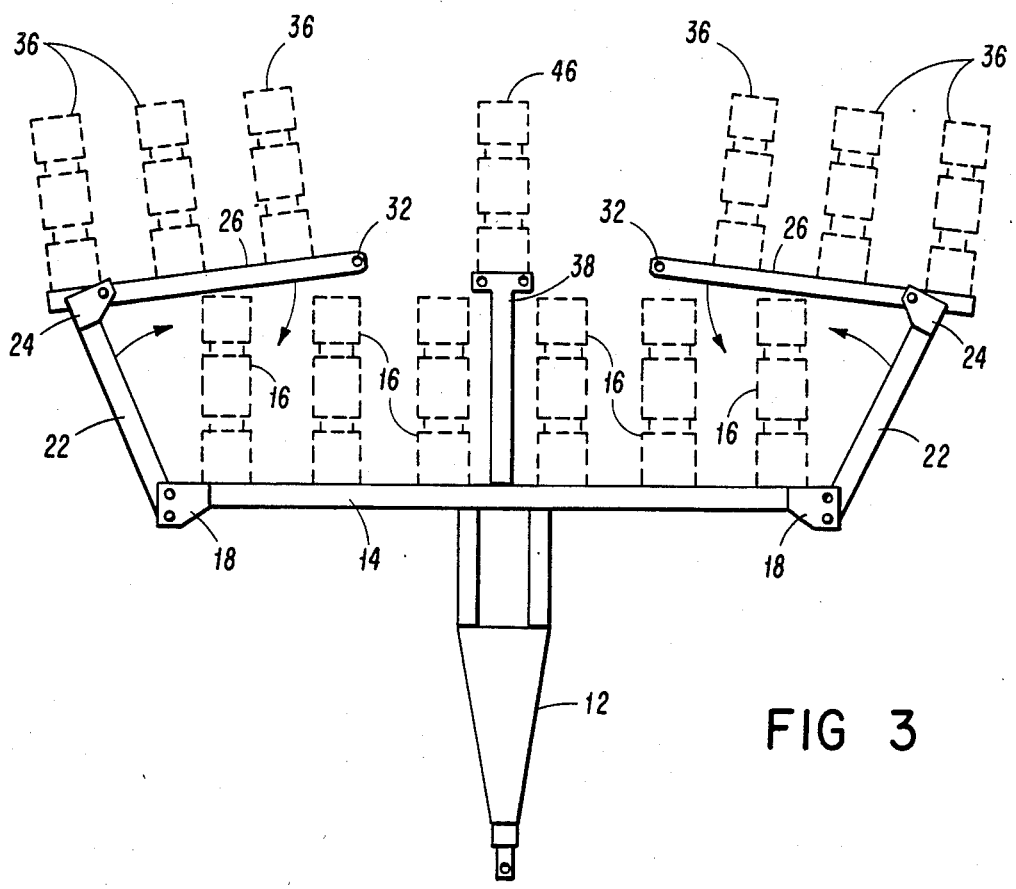
FIG. 3 is a top or plan view showing the toolbar in a position in which the outer sections are being moved to a folded position.

When it is desired to transport the unit of the invention over the road, it is a very simple and easy procedure to pivot the intermediate section 22 and outer section 26 into the position shown in FIG. 4 in which the unit is approximately half the width of that when in its fully extended position. By simply removing the pivot pin 30 at each end of the main section 14 the outer sections 26 can be swung rearwardly while at the same time the intermediate sections 22 can be swung rearwardly and inwardly. Since the attachments 36 are affixed to the outer sections 26, these also will be swung rearwardly along with the outer sections 26. Because of the dimensions of the various sections, and because of the double pivot arrangement, after the free ends of the outer sections 26 clear the attachments 16, the intermediate sections 22 can be swung inwardly along with the outer sections 26 until the outer sections 26 are to the rear of the attachments 16. This is illustrated in FIG. 3. Continued pivoting of the intermediate sections 22 and the outer sections 26 will bring the sections to a position where the intermediate sections 22 extend rearwardly at an angle of 90° to the main section 14 while the outer sections 26 will be parallel to main section 14 and rearwardly of the attachments 16. This is illustrated in FIG. 4. In order to make the unit entirely stable and to lock the pivoting intermediate sections 22 and outer sections 26 in place, there is provided a center support arm 38 that extends rearwardly from main section 14 at its center. Center support arm 38 is, of course, in the same plane as the main section 14, the intermediate sections 22 and the outer sections 26 and is rigidly affixed to the main section 14. At the rear end of the support arm 38 is a pair of spaced apart plates 40 through which extend openings 42. Openings 42 in plates 40 at the outer end of support arm 38 and openings 32 in the free ends of outer sections 26 will be in alignment when the various sections are positioned as shown in FIG. 4 so that pivot pins 44 can be passed through the aligned openings to lock the unit in place in the position shown in FIG. 4.

Because of the dimensions selected by proper design of the various sections of the toolbar 10, when the sections are folded into the position shown in FIG. 4, the attachments 36 will be precisely between the attachments 16 thereby providing row spacings one-half the row spacings of the fully extended unit in FIG. 1. In other words, if in the fully extended position of FIG. 1 the row spacings are 30" for corn operations, the row spacings will be 15" for soybean operations when in the folded position of FIG. 4. There does however have to be added one additional attachment 46 which can manually be attached to and aligned with the center support arm 38 in any suitable manner.

Thus, when in the folded position of FIG. 4, the unit can easily be towed over the road, and since all of the sections are in the same horizontal plane, the unit will be very stable and therefore easy to tow safely. Mbre importantly, however, is the fact that when in the folded position of FIG. 4, the unit can be used for narrow row operations utilizing all and only the components that are used in the fully extended operation for wide rows except for the addition of the one attachment 46. The unit of the invention therefore eliminates the necessity to purchase and maintain two specialized units, one for the more popular and typical 30" row width and one for the more narrow row width of 15". At the present time, the farmer must purchase two units one of which must sit idle while the other is being used. Note that with the unit of the invention, the conversion can be made quickly and easily by merely the removal of two pivot pins, pivoting the units into a tandem arrangement and reinserting the pivot pins to lock the unit in the tandem, folded arrangement. Thus, the farmer is using all of the units that he has invested in all of the time rather than having a complete, separate specialized unit sitting idly by.

In the preferred embodiment described herein, the various sections are manually moved from the fully extended position to the folded or tandem position. Obviously, when in the tandem position of FIG. 4, the units can be quickly and easily moved to the fully extended position by removal of the pivot pins 44, pivoting of the outer sections 26 and intermediate sections 22 to the fully extended position of FIG. 1, and insertion of the pivot pins into the openings 32. The preferred embodiment describes this as being done manually, but it will be obvious to those skilled in the art that hydraulic cylinders could be employed to assist in the movement and the pivoting of the unit from one position to the other. Moreover, it will be obvious to those skilled in the art that the principles of the invention can be used for any kind of agricultural equipment, self-propelled or towed, in which multiple row operations of any width and number are to be performed. The invention certainly has application to planting, fertilizing and tillage operations, but is not limited to such operations.

The preferred embodiment illustrates the simplest construction of a toolbar constructed according to the principles of the invention. Obviously, different locking means other than pins could be used to maintain the toolbar in one of its two operative positions. Also, the principles are clearly applicable to toolbars designed for multiple rows greater than twelve. Thus, it will be obvious to those skilled in the art that various revisions and modifications can be made to the preferred embodiment of the invention without departing from the spirit and scope of the invention. It is my intention, however, that all such revisions and modifications as are obvious to those skilled in the art will be included within the scope of the following claims.

What is claimed is:

1. A toolbar providing for the mounting of a plurality of agricultural attachments used in performing various agricultural procedures along spaced-apart rows in a field, said toolbar comprising a main section extending in a horizontal plane and oriented generally transverse to the direction of movement along the rows, means combined with the main section to provide for connection of the toolbar to a prime mover, a first section pivotally connected near each outer end of the main section for swingable movement relative to the main section within a horizontal plane containing the main section, the first sections being of substantially the same length, first means for maintaining each first section in a first selected operative position relative to the main section, the first operative position being such that each first section is generally parallel to the main section, a second section pivotally secured at one of its ends near the outer end of each of the first sections for swingable movement relative to the first section in said horizontal plane containing the main section, the second sections being of substantially the same length, the spacing between the pivot point of a first section and the main section and the pivot point of each first and second sections being a predetermined fixed distance, second means for maintaining each second section in a first selected operative position relative to the main section, the first operative position being such that the second section is generally parallel to and aligned with the main section with the free end of each second section extending inwardly, the first and second sections when each are in their respective first operative positions forming a toolbar that is in its most fully extended operative position with all sections generally parallel and in the same plane, each first section and each second section being selectively moveable in the same plane to a second operative position in which each first section extends perpendicular and rearwardly of the main section and each second section extends parallel to and is spaced rearwardly from the main section with the free end of each second section extending inwardly, and third means to maintain the main section and each first section and each second section in their respective second operative positions all contain the same plane whereby the width of the entire toolbar when the sections are in such second operative positions is approximately one-half of that when the first and second sections are in their respective first operative positions with the toolbar in its most fully extended operative position.

2. A toolbar providing for the mounting of a plurality of agricultural attachments used in performing various agricultural procedures along spaced-apart rows in a field, said toolbar comprising a main section extending in a horizontal plane and oriented generally transverse to the direction of movement along the rows, means combined with the main section provide for connection of the toolbar to a prime mover, a first section pivotally connected near each outer end of the main section for swingable movement relative to the main section in substantially the same horizontal plane as the main section, the pivot point between the main section and each first section being offset forwardly of the main section, first means for maintaining each first section in a first selected operative position relative to the main section, the first operative position being such that each first section is generally parallel to the main section, the second section pivotally secured at one of its ends near the outer end of each of the first sections for swingable movement relative to the first section in substantially the same horizontal plane as the main section, the pivot point between each first section and its respective second section being offset rearwardly of the first section, the spacing between the pivot point of a first section and the main section and the pivot point of each first and second sections being a predetermined fixed distance, second means for maintaining each second section in a first selected operative position relative to the main section, the first operative position being such that the second section is generally parallel to and in substantial linear alignment with the main section with the free end of each second section extending inwardly, the first and second sections when each are in their respective first operative positions forming a toolbar that is in its most fully extended operative position, each first section and each second section being selectively moveable in substantially the same horizontal plane to a second operative position in which each first section extends perpendicular and rearwardly of the main section and each second section extends parallel to and is spaced rearwardly from the main section with the free end of each second section extending inwardly, and third means to maintain the main section on each first section and each second section in their respective operative positions whereby the width of the entire toolbar when the sections are in such second operative position is approximately one-half of that when the first and second sections are in their respective first operative positions with the toolbar in its most fully extended condition.

3. The toolbar of claim 2 in which the length of each first and second section is approximately one-half the length of the main section.

4. The toolbar of claim 3 in which the pivotably secured end of each second section extends outwardly beyond the pivot point with the first section so that when the first and second sections are in their first operative positions the same number of agricultural attachments can be connected to the two second sections as can be connected to the main section.

5. The toolbar of claim 4 in which the third means includes a member rigidly affixed to the main section at a point near its center and extending rearwardly, the member providing for connection of a single agricultural attachment when the first and second sections are in their second operative positions.

6. The toolbar of claim 5 in which the dimensions of the main section, first sections and second sections are such that agricultural attachments when connected to the second sections will be spaced-apart the same distance as the spacing of the agricultural attachments connected to the main section when the first and second sections are in their first operative positions, and when the first and second sections are in their second operative positions, the agricultural attachments connected to the second said sections will be positioned on lines that bisect the spacing of the attachments connected to the main section so that when in the second operative position and without adjusting the position of the attachments on either the main section or the second section the toolbar can be used on row widths one-half the row widths of those when in the first operative position.

* * * * *